(12) United States Patent
Barnett et al.

(10) Patent No.: US 9,355,672 B2
(45) Date of Patent: May 31, 2016

(54) DISK DRIVE PREAMPLIFIER R/C DIFFERENTIAL MODE FILTER OF POWER SUPPLY

(71) Applicant: TEXAS INSTRUMENTS INCORPORATED, Dallas, TX (US)

(72) Inventors: Raymond E. Barnett, Shoreview, MN (US); Douglas Dean, Eagan, MN (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 14/709,320

(22) Filed: May 11, 2015

(65) Prior Publication Data
US 2015/0340062 A1 Nov. 26, 2015

Related U.S. Application Data

(60) Provisional application No. 62/022,491, filed on May 23, 2014.

(51) Int. Cl.
| | |
|---|---|
| *G11B 5/02* | (2006.01) |
| *G11B 7/1263* | (2012.01) |
| *G11B 5/09* | (2006.01) |
| *G11B 5/39* | (2006.01) |
| *G11B 5/00* | (2006.01) |

(52) U.S. Cl.
CPC ............... *G11B 7/1263* (2013.01); *G11B 5/09* (2013.01); *G11B 5/39* (2013.01); *G11B 2005/0018* (2013.01)

(58) Field of Classification Search
CPC .... G11B 5/02; G11B 5/012; G11B 2005/016; G11B 2220/90; G11B 27/11; G11B 5/09; G11B 20/10009; G11B 2220/20; G11B 27/36
USPC .............................. 360/67, 68, 69, 31, 46, 154
See application file for complete search history.

(56) References Cited

U.S. PATENT DOCUMENTS

| | | | | |
|---|---|---|---|---|
| 6,111,716 | A * | 8/2000 | Ngo .................. | G11B 5/012 360/67 |
| 7,224,760 | B1 * | 5/2007 | Rokhsaz .............. | H03D 13/003 360/46 |
| 8,064,158 | B1 * | 11/2011 | Carter ................. | G05B 11/01 360/78.12 |
| 2014/0063639 | A1 * | 3/2014 | Dean .................. | G11B 5/02 360/68 |

* cited by examiner

*Primary Examiner* — Nabil Hindi
(74) *Attorney, Agent, or Firm* — Lawrence J. Bassuk; Frank D. Cimino

(57) ABSTRACT

A disk drive preamplifier integrated circuit. The integrated circuit comprises a differential output driver configured to drive readback data to an output load, wherein the output driver comprises a differential mode filter configured to filter alternating current of an on-chip power supply.

16 Claims, 3 Drawing Sheets

DISK DRIVE PREAMPLIFIER R/C DIFFERENTIAL MODE FILTER OF POWER SUPPLY

CROSS-REFERENCE TO RELATED APPLICATIONS

The present application claims priority to U.S. Provisional Patent Application No. 62/002,491, filed May 23, 2014, titled "Differential Class AB Output Stage With Differential Mode On Chip Supply Filter," which is hereby incorporated herein by reference in its entirety.

BACKGROUND

A hard disk drive comprises one or more platters or disks that are coated with material that is magnetizable. Physical locations on the disk are associated with memory locations or memory addresses. Each location may represent a single bit of information: a logic high or a logic low, depending on the polarity of the magnetization. The data stored on the disk may be read by a sensor, for example a magnetoresistive sensor, that is able to detect the magnetic polarity transitions at memory locations on the disk as the disk rotates. Memory locations are typically distributed on the disks in circular lanes called tracks. Because memory locations may be distributed across the disk with a uniform density per unit area, more memory locations may be read per unit of time in tracks near the outer circumference of the disk than in tracks near the center of the disk. The sensors may be referred to as read heads and may comprise read sensors as well as other components. The output of the sensors, which may be referred to as readback data, may have very low signal strength. A preamplifier may be located relatively close to the sensors to significantly boost the sensor output before driving the boosted readback data to a circuit board or system on a chip (SoC) in a hard disk drive enclosure. The hard disk drive may comprise a write head to write data to the disk and a sensor to determine a distance of the read head and/or the write head from the surface of the disk. The hard disk drive may monitor and adjust the height of the read head and/or the write head above the disk, typically to maintain a preferred height.

Optical disk drives may share some commonalities with hard disk drives. The memory locations in an optical disk drive are read by directing a laser beam onto the memory location and reading back reflection of the laser beam by a photodiode, for example. If a pit in the surface of the disk is present at a memory location, the reflected light adds out-of-phase with other laser reflected light, adding destructively, and the photodiode detects less light. If no pit in the surface of the disk is present at the memory location, the reflected light adds in-phase, and the photodiode detects relatively more light. The output of the photodiode (e.g., readback data) may be amplified by a preamplifier before driving the readback data to the circuit board or SoC of the optical disk drive.

SUMMARY

In an embodiment, a disk drive preamplifier integrated circuit is disclosed. The integrated circuit comprises a differential class-AB output driver configured to drive readback data to an output load, wherein the output driver comprises a differential mode filter configured to filter alternating current of an on-chip power supply.

In an embodiment, a method of driving disk drive readback data is disclosed. The method comprises receiving a differential readback data signal by a disk drive preamplifier integrated circuit and amplifying the differential readback data signal by an input stage of the preamplifier integrated circuit to generate an amplified differential readback data signal. The method further comprises driving the amplified differential readback signal into an output load by an output stage of the preamplifier integrated circuit, wherein the output stage is an AB unity gain amplifier and filtering an alternating current signal provided to the output stage of the preamplifier by a differential mode filter of the preamplifier integrated circuit.

In an embodiment, a hard disk drive (HDD) preamplifier integrated circuit is disclosed. The integrated circuit comprises, a high gain input stage configured to amplify a differential readback data input signal, where the high gain input stage is configured to receive electrical power from an on-chip power supply, a differential class-AB unity gain output stage configured to receive electrical power from the on-chip power supply, to receive a differential output of the high gain input stage, and to drive a differential readback data signal into an output load, and a differential mode filter configured to filter on-chip power supply and to source current to the output load.

These and other features will be more clearly understood from the following detailed description taken in conjunction with the accompanying drawings and claims.

BRIEF DESCRIPTION OF THE DRAWINGS

For a detailed description of various examples, reference will now be made to the accompanying drawings in which.

DETAILED DESCRIPTION

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct wired or wireless connection. Thus, if a first device couples to a second device, that connection may be through a direct connection or through an indirect connection via other devices and connections.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a high gain, wide band, low noise preamplifier integrated circuit having a differential mode filter in the output stage to attenuate the transient current demand on the on-chip power supply. The differential mode filter comprises resistor elements and capacitor elements that may be implemented using little area on the integrated circuit. The preamplifier may be deployed in a design that makes significant output current demands on the output stage, for example driving a 100 ohm load at relatively high frequency. Such a preamplifier may be at risk of power supply feedback that infiltrates a high gain input stage through parasitic inductances in the power input rails and degrades the fidelity of the preamplifier. The present disclosure teaches a differential mode filter that overcomes this risk by attenuating the transient current load on the on-chip power supply or power channels and supplies much of the current transients from capacitor circuit elements.

Figure 1:
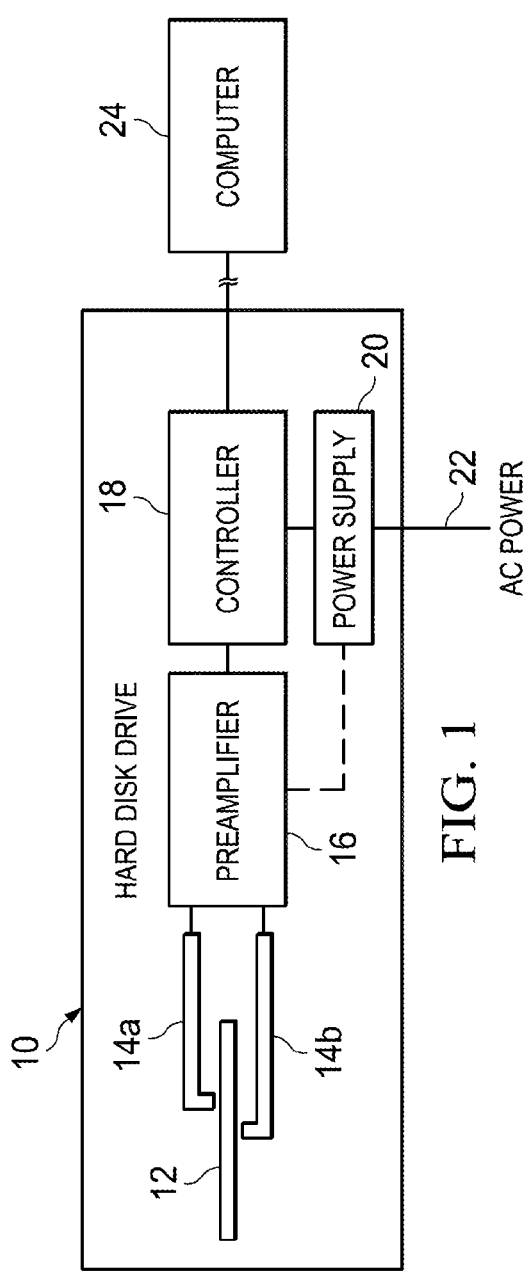
FIG. 1 shows a hard disk drive in accordance with various examples.

Turning now to FIG. 1, a hard disk drive 10 is described. In an embodiment, the hard disk drive 10 may comprise a memory disk 12, a read head 14, a preamplifier 16, and a controller 18. In an embodiment, a computer 24 may send read requests to the hard disk drive 10 and receive data back. The computer 24 may be coupled to the hard disk drive 10 via a network connection, via a backplane, via a ribbon cable, or via some other coupling. In an embodiment, the read head 14 may comprise a first read head 14a and a second read head 14b. The first read head 14a may read from a first surface of the memory disk 12 (e.g., a top surface, and the second read head 14b may read from a second surface of the memory disk 12 (e.g., a bottom surface). The memory disk 12 may be coated on one or both surfaces with material that is magnetizable. The read head 14 may comprise a magnetoresistive sensor or some other sensor that is configured to sense magnetic fields imparted to small localized areas on the surface of the memory disk 12. The preamplifier 16 may be implemented as an integrated circuit or as a semiconductor chip. The preamplifier 16 may be coupled to the controller 18 by a ribbon cable or by another conducting circuit.

Electrical power to the hard disk drive 10 may be supplied from an external source. For example, a computer may provide direct current (DC)+5 VDC and +12 VDC power to the electronics of the disk drive 10. A negative DC power may be provided by a servo chip that drives a motor of the hard disk drive 10. The preamplifier 16 may receive one or both of the +5 VDC and +12 VDC electrical power. In another embodiment, however, power may be supplied to the preamplifier 16 in a different manner.

The controller 18 receives commands from the computer 24 or other external device and responds accordingly. While only read circuitry and components are shown in FIG. 1 and discussed here, it is understood that the hard disk drive 10 may comprise circuitry and components to promote writing to the memory disk 12. For example, the hard disk drive 10 may further comprise one or more write heads to write to the surfaces of the memory disk 12 under control of the controller 18.

In an embodiment, the hard disk drive 10 may comprise a plurality of memory disks 12. In an embodiment comprising multiple disks 12, each disk 12 may be associated to a separate preamplifier 16. Alternatively, two or more disks 12 may be associated with a single preamplifier 16.

Figure 2:
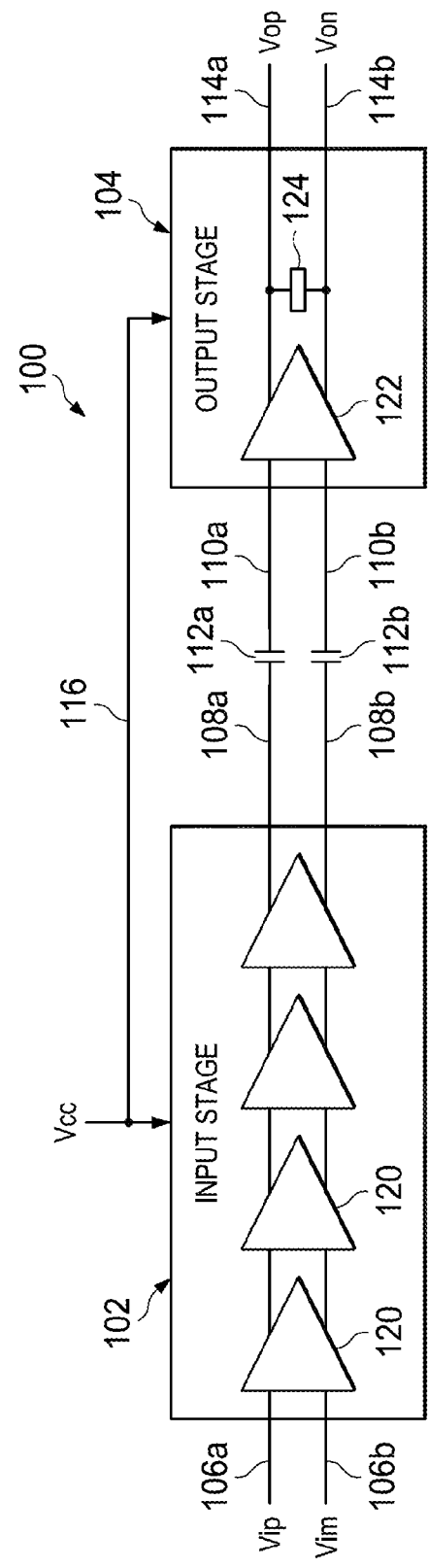
FIG. 2 shows a hard disk drive preamplifier in accordance with various examples.

Turning now to FIG. 2, a preamplifier circuit 100 is described. The preamplifier circuit 100 may be implemented as an integrated circuit or as part of an integrated circuit comprising additional electronic functionality. The preamplifier circuit 100 may be implemented in various semiconductor technologies such as in Silicon Germanium (SiGE) semiconductor technology, in high speed complementary metal-oxide semiconductor (CMOS) semiconductor technology, etc. In some examples, the preamplifier circuit 100 may be used in the role of the preamplifier 16 of the hard disk drive 10 described above with reference to FIG. 1.

The preamplifier circuit 100 may be used in a variety of practical applications. Examples of applications for use of the disclosed preamplifier 100 may include preamplification of readback data signals from a magnetoresistive sensor in a hard disk drive (HDD), preamplification of readback data signals from a photodiode in an optical disk drive, or other applications that rely on a high gain, wide band (e.g., broad bandwidth), low total harmonic distortion (THD) preamplifier driving a significant load and other applications. In an embodiment, the preamplifier circuit 100 may be used to provide at least 37 dB gain over a frequency band from about 100 kHz to about 1 GHz with less than 1.5% total harmonic distortion while driving an output load of less than about 200 ohms. In some embodiments, the preamplifier circuit 100 may be used to provide at least 56 dB gain over a frequency band from about 50 kHz to about 4 GHz with less than 1% total harmonic distortion while driving an output load of about 100 ohms.

In the example of FIG. 2, the preamplifier circuit 100 comprises an input stage 102, which is configured to receive a differential input, and an output stage 104 or output driver. The differential input 106 to the input stage 102, and thus to the preamplifier circuit 100, comprises a plus differential input 106a and a minus differential input 106b. The input signal received on differential input 106 may be amplified by a cascaded series of amplifiers 120. While the embodiment of FIG. 2 shows the input stage 102 comprising four cascaded amplifiers 120, in another embodiment, either fewer or more amplifiers 120 may be cascaded to accomplish the desired amount of gain in the input stage 102. A differential output 108 of the input stage 102 comprises a plus differential output 108a and a minus differential output 108b. A differential input 110 of the output stage 104 comprises a plus differential input 110a of the output stage 104 and a minus differential input 110b of the output stage 104. The differential output 108 of the input stage 102 is AC coupled to the differential input 110 of the output stage 104 by two capacitors 112a and 112b. A differential output 114 of the output stage 104 and of the preamplifier circuit 100 comprises a plus differential output 114a (Vop) and a minus differential output 114b (Von). On-chip power supply 116 to the input stage 102 and to the output stage 104 is provided by a power source labeled Vcc. The source of Vcc may be input to the integrated circuit in which the preamplifier circuit 100 is embedded (note in some embodiments, the preamplifier circuit 100 may be a stand-alone circuit, in other embodiments the preamplifier circuit 100 may be embedded with other circuit components in an integrated circuit).

Because the lines indicated schematically in FIG. 2 are implemented by physical materials, parasitic inductances may be present in the lines supplying Vcc power to components in the preamplifier circuit 100. These parasitic inductances can cause distortion as they mutually couple to the preamplifier input. Said in another way, current variation in Vcc can feedback into the input stage 102 via the parasitic inductance in the power supply lines of the preamplifier circuit 100. This coupling can be particularly perturbing to the input stage 102 because it is a high gain stage and thus amplifies any error or distortion introduced many times over. In addition to inductive coupling, there may be capacitive coupling internally on the preamplifier circuit 100 that can cause similar issues. The input 106 may receive differential readback data from a reader head, for example from a magnetoresistive reader head of a hard disk drive or from a photodiode reader head of an optical disk drive. In another embodiment, the input may be a differential input received from a different source in a different technical system.

Figure 3:
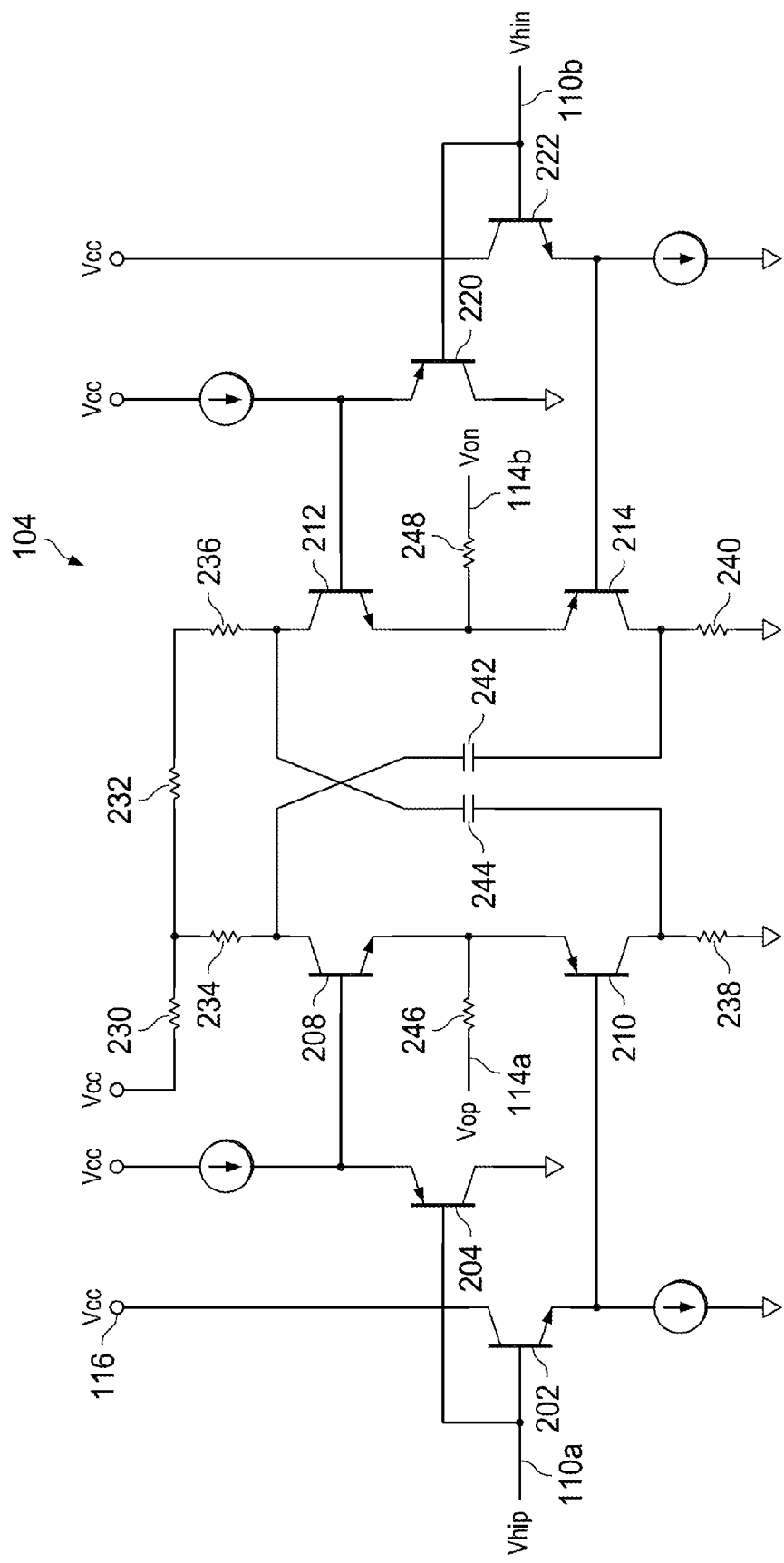
FIG. 3 shows an output driver stage of a hard disk drive preamplifier in accordance with various examples.

Turning now to FIG. 3, details of an example of the output stage 104 or output driver are described. The output stage 104 provides little or no gain (may provide "unity" gain). The role of the output stage 104 is to deliver the current needed to drive an output load at the voltage levels determined by the gains of the input stage 102 without loading down the input stage 102 (e.g., the output stage 104 may have a high input impedance). In an embodiment, the output stage 104 implements a differential Class AB amplifier. The plus differential input 110a (Vhip) is received at the base of an output driver plus differential input NPN transistor 202 and at the base of an output driver plus differential input PNP transistor 204. The minus differential input 110b (Vhin) is received at the base of an output driver minus differential input NPN transistor 222 and at the base of an output driver minus differential input PNP transistor 220.

The emitter of the output driver plus differential input PNP transistor 204 is connected to the base of a NPN transistor 208, and the emitter of the output driver plus differential input NPN transistor 202 is connected to the base of a PNP transistor 210. The NPN transistor 208 and the PNP transistor 210 may be said to form a plus differential output push-pull circuit. Thus, the NPN transistor 208 may be referred to as a plus differential output push-pull circuit NPN transistor 208, and the PNP transistor 210 may be referred to as a plus differential output push-pull circuit PNP transistor 210.

The emitter of the output driver minus differential input PNP transistor 220 is connected to the base of a NPN transistor 212, and the emitter of the output driver minus differential input NPN transistor 222 is connected to the base of a PNP transistor 214. The NPN transistor 212 and the PNP transistor 214 may be said to form a minus differential output push-pull circuit. Thus, the NPN transistor 212 may be referred to as a minus differential output push-pull circuit NPN transistor 212, and the PNP transistor 214 may be referred to as a minus differential output push-pull circuit PNP transistor 214.

The collector of the output driver plus differential input NPN transistor 202 is connected to Vcc, and the emitter of the output driver plus differential input NPN transistor 202 is coupled to ground through a constant currant source. The emitter of the output driver plus differential input PNP transistor 204 is coupled to Vcc through a constant current source, and the collector of the output driver plus differential input PNP transistor 204 is connected to ground. The collector of the output driver minus differential input NPN transistor 222 is connected to Vcc, and the emitter of the output driver minus differential input NPN transistor 222 is coupled to ground through a constant current source. The emitter of the output driver minus differential input PNP transistor 220 is coupled to Vcc via a constant current source, and the collector of the output driver minus differential input PNP transistor 220 is connected to ground. The emitter of the plus differential output push-pull circuit NPN transistor 208 is connected to the emitter of the plus differential output push-pull circuit PNP transistor 210. The emitters of the plus differential output push-pull circuit NPN transistor 208 and the plus differential output push-pull circuit PNP transistor 210 are connected to a first resistance 246. The differential plus output 114a of the output stage 104 and of the preamplifier circuit 100 as a whole—Vop—is taken at the output of the first resistance 246. The emitter of the minus differential output push-pull circuit NPN transistor 212 is connected to the emitter of the minus differential output push-pull circuit PNP transistor 214. The emitters of the minus differential output push-pull circuit NPN transistor 212 and of the minus differential output push-pull circuit PNP transistor 214 are connected to a second resistance 248. The differential minus output 114b of the output stage 104 and of the preamplifier circuit 100 as a whole—Von—is taken at the output of the second resistance 248.

A first capacitor 242 is connected between the collector of the minus differential output push-pull circuit PNP transistor 214 and the collector of the plus differential output push-pull circuit NPN transistor 208. A second capacitor 244 is connected between the collector of the plus differential output push-pull circuit PNP transistor 210 and the collector of the minus differential output push-pull circuit NPN transistor 212. A third resistance 238 is connected between the collector of the plus differential output push-pull circuit PNP transistor 210 and ground. A fourth resistance 240 is connected between the collector of the minus differential output push-pull circuit PNP transistor 214 and ground. A fifth resistance 230 is connected to Vcc and to a first end of a sixth resistance 234. The second end of the sixth resistance 234 is connected to the collector of the plus differential output push-pull circuit NPN transistor 208. A first end of a seventh resistance 232 is connected to the first end of the sixth resistance 234, and a second end of the seventh resistance 232 is connected to a first end of an eighth resistance 236. The second end of the eighth resistance 236 is connected to the collector of the minus differential output push-pull circuit NPN transistor 212.

The first capacitor 242, the second capacitor 244, the third resistance 238, the fourth resistance 240, the sixth resistance 234, and the eighth resistance 236 comprise a differential mode filter. The implementation of this differential mode filter in resistive and capacitive components support on-chip implementation in a relatively small area or footprint. The differential mode filter may be said to re-route alternating currents in a local loop, thereby reducing the current load on the on-chip power supply (Vcc) and thereby reducing the susceptibility of the input stage 102 to feedback distortion via parasitic inductances in the on-chip power lines. When Vop>Von, current flows into the collector of the plus differential output push-pull circuit NPN transistor 208, out the emitter of the plus differential output push-pull circuit NPN transistor 208, and out through the first resistance 246 to the plus differential output 114a, through the output load circuit, in through the second resistance 248, and up the emitter of the minus differential output push-pull circuit PNP transistor 214. In this circumstance (Vop>Von), the current flow into the collector of the plus differential output push-pull circuit NPN transistor 208 is supplied in part by the first capacitor 242. When Vop<Von, current flows into the collector of the minus differential output push-pull circuit NPN transistor 212, out the emitter of the minus differential output push-pull circuit NPN transistor 212, and out the second resistance 248 to the minimum differential output 114b, through the output load circuit, in through the first resistance 246, and up the emitter of the plus differential output push-pull circuit PNP transistor 210. In this circumstance (Vop<Von), the current flow in the collector of the minus differential output push-pull circuit NPN transistor 212 is supplied in part by the second capacitor 244. The current supplied by the capacitors 242, 244 reduces the amplitude of the current flow in the on-chip power Vcc lines. The differential mode filter may be said to filter alternating current of the on-chip power supply Vcc. When Vhip>Vhin then Vop>Von; and, when Vhip<Vhin, then Vop<Von. This follows from the unity gain associated with the output stage 104.

An unfiltered Vcc may see current peaks at twice the frequency of the input to the input stage 102. On a first half of the cycle of the input, a current peak is provided by Vcc that is associated with current flowing up the collector of the plus differential output push-pull circuit NPN transistor 208 occurs when Vop>Von; then a current trough is provided by Vcc when Vop=Von; and a second current peak is provided by Vcc that is associated with current flowing up the collector of the minus differential output push-pull circuit NPN transistor 212 when Vop<Von; then a current trough is provided by Vcc when Vop=Von; then the cycle repeats. This kind of surging current provided by Vcc at twice the frequency of the input signal to the preamplifier 100 has a propensity for generating second harmonic feedback distortion. The differential mode filter taught by the present disclosure reduces the risk of this kind of second harmonic feedback distortion.

It is understood that various embodiments may vary from the examples described above. For example, in other embodiments, there may be additional resistance components or fewer resistance components. For example, the path for feeding Vcc power 116 into the differential push-pull circuits may be different than the paths through fifth resistance 230 and seventh resistance 232 shown in FIG. 3. It is noted that the fifth resistance 230 and the seventh resistance 232 represent chip parasitic resistances and are not explicit resistor components. The output through the first resistance 246 and second resistance 248 may be different, for example the resistance 246 and second resistance 248 may be absent from the preamplifier circuit 104. A resistance that is shown as a single resistor component in FIG. 3 may be implemented as a plurality of resistors in series, resistors in parallel, or both. Likewise, a capacitor shown as a single capacitor component in FIG. 3 or FIG. 2 may be implemented as a plurality of capacitors in parallel, capacitors in series, or both.

Figure 4:
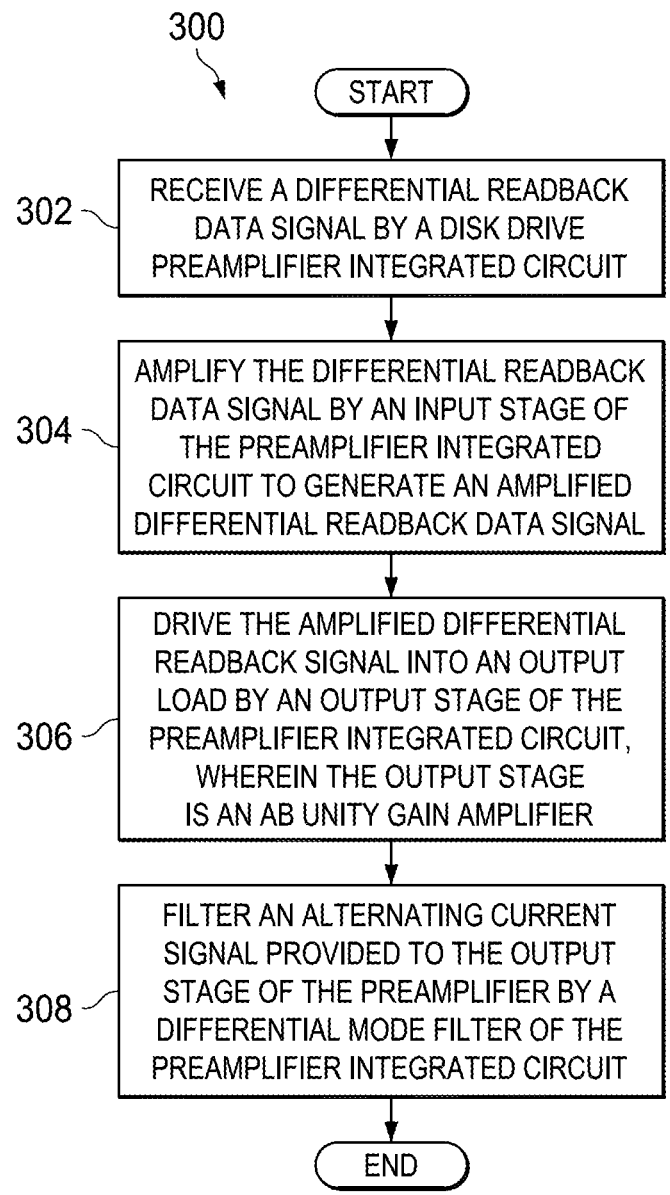
FIG. 4 shows a flow chart of a method in accordance with various examples.

Turning now to FIG. 4, a method 300 is described. At block 302, a differential readback data signal is received by a disk drive preamplifier integrated circuit. At block 304, the differential readback data signal is amplified by an input stage of the preamplifier integrated circuit to generate an amplified differential readback data signal. At block 306, the amplified differential readback signal is driven into an output load by an output stage of the preamplifier integrated circuit, wherein the output stage is an AB unity gain amplifier. At block 308, an alternating current signal provided to the output stage of the preamplifier is filtered by a differential mode filter of the preamplifier integrated circuit. The result of the filtering, in an embodiment, promotes the disk drive preamplifier integrated circuit providing high gain wide band amplification with less than about 1.5% total harmonic distortion. For example, the integrated circuit may amplify readback data by at least 35 dB over the frequency range from about 100 kHz to about 1 GHz. Alternatively, the integrated circuit may amplify readback data by at least 37 dB over the frequency range from about 100 kHz to about 1 GHz. Alternatively, the integrated circuit may amplify readback data by at least 40 dB over the frequency range from about 50 kHz to about 4 GHz.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A disk drive preamplifier integrated circuit, comprising:
a high gain input stage that is configured to draw electrical power from an on-chip power supply, to receive a differential readback data signal from a reader head, and to output a high amplitude differential readback signal;
a differential output driver configured to drive the high amplitude differential readback signal to an output load, the output driver including a differential mode filter configured to filter alternating current of the on-chip power supply, the differential mode filter including a plurality of capacitors to AC couple the output from the high gain input stage to the output driver.

2. The integrated circuit of claim 1, wherein the differential output driver is a class AB amplifier.

3. The integrated circuit of claim 1, wherein the preamplifier integrated circuit is configured to drive readback data to an output load of less than 200 ohms and to operate over a frequency band from 100 kilohertz (kHz) to 2 gigahertz (GHz), with a gain of at least 35 dB, and with a maximum total harmonic distortion of less than 1.5 percent.

4. The integrated circuit of claim 1, wherein the preamplifier circuit is one of a hard disk drive preamplifier integrated circuit and an optical disk drive preamplifier circuit.

5. The integrated circuit of claim 1, wherein the differential mode filter comprises a first capacitor connected to a collector of a PNP transistor in a plus differential output push-pull circuit and connected to a collector of an NPN transistor in a minus differential output push-pull circuit and comprises a second capacitor connected to a collector of a PNP transistor in the minus differential output push-pull circuit and to a collector of a NPN transistor in the plus differential output push-pull circuit.

6. The integrated circuit of claim 5, wherein the differential mode filter further comprises a first resistor coupling the on-chip power supply to an emitter of the NPN transistor in the plus differential output push-pull circuit, a second resistor coupling the on-chip power supply to an emitter of the NPN transistor in the minus differential output push-pull circuit, a third resistor coupling an emitter of the PNP transistor of the plus differential output push-pull circuit to ground, and a fourth resistor coupling an emitter of the PNP transistor of the minus differential output push-pull circuit to ground.

7. A method of driving disk drive readback data, comprising:
receiving a differential readback data signal by a disk drive preamplifier integrated circuit;
amplifying the differential readback data signal by an input stage of the preamplifier integrated circuit to generate an amplified differential readback data signal;
driving the amplified differential readback signal into an output load by an output stage of the preamplifier integrated circuit, wherein the output stage is a unity gain amplifier; and
filtering an alternating current signal provided to the output stage of the preamplifier by a differential mode filter of the preamplifier integrated circuit, the filtering the alternating current signal includes supplying at least part of the current flowing into a plus differential output push-pull circuit component of the output stage of the preamplifier from a first capacitor when an output voltage of the output stage has a first polarity and supplying at least part of the current flowing into a minus differential output push-pull circuit component of the output stage of the preamplifier from a second capacitor when the output voltage of the output stage has a polarity opposite to the first polarity.

8. The method of claim 7, wherein the output stage of the preamplifier integrated circuit is a class AB amplifier.

9. The method of claim 7, wherein the differential readback data is received from a magnetoresistive sensor.

10. The method of claim 7, wherein the differential readback data is received from a photodiode sensor.

11. The method of claim 7, wherein amplifying the differential readback data signal by the input stage comprises amplifying the differential readback data signal by at least 37 dB by the input stage.

12. A hard disk drive (HDD), comprising:
a magnetoresistive readback sensor configured to read from a memory disk;
a preamplifier integrated circuit coupled to the sensor including:
an input stage configured to amplify a differential readback data input signal, where the input stage is configured to receive electrical power from an on-chip power supply;
a differential class-AB unity gain output stage configured to receive electrical power from the on-chip power supply, to receive a differential output of the input stage, and to drive a differential readback data signal into an output load; and
a differential mode filter configured to filter the on-chip power supply and to source current to the output load; and
a controller circuit coupled to the preamplifier.

13. The integrated circuit of claim 12, wherein the hard disk drive comprises a plurality of magnetoresistive readback sensors and wherein the high gain input stage is coupled to the plurality of sensors.

14. The integrated circuit of claim 12, where the input stage is a high gain input stage configured to amplify the differential readback data input signal by at least 37 dB.

15. The integrated circuit of claim 12, wherein the differential mode filter comprises a first capacitor connected to a collector of a PNP transistor in a plus differential output push-pull circuit and connected to a collector of an NPN transistor in a minus differential output push-pull circuit and comprises a second capacitor connected to a collector of a PNP transistor in the minus differential output push-pull circuit and to a collector of a NPN transistor in the plus differential output push-pull circuit.

16. The integrated circuit of claim 15, wherein the differential mode filter further comprises a first resistor coupling the on-chip power supply to an emitter of the NPN transistor in the plus differential output push-pull circuit, a second resistor coupling the on-chip power supply to an emitter of the NPN transistor in the minus differential output push-pull circuit, a third resistor coupling an emitter of the PNP transistor of the plus differential output push-pull circuit to ground, and a fourth resistor coupling an emitter of the PNP transistor of the minus differential output push-pull circuit to ground.

* * * * *